(12) United States Patent
Murakami et al.

(10) Patent No.: US 7,336,655 B2
(45) Date of Patent: Feb. 26, 2008

(54) SYSTEM AND METHOD FOR RECORDING CALL DETAILS AND MEMORY PRODUCT

(75) Inventors: Masahiko Murakami, Kawasaki (JP); Sumiyo Okada, Kawasaki (JP); Satoshi Okuyama, Kawasaki (JP); Keizo Terawaki, Shinagawa (JP); Yoshitaka Ogawa, Shinagawa (JP); Masaru Ikeda, Shinagawa (JP)

(73) Assignees: Fujitsu Limited, Kawasaki (JP); Nifty Corporation, Tokyo (JP)

( * ) Notice: Subject to any disclaimer, the term of this patent is extended or adjusted under 35 U.S.C. 154(b) by 555 days.

(21) Appl. No.: 11/054,541

(22) Filed: Feb. 10, 2005

(65) Prior Publication Data

US 2006/0067303 A1 Mar. 30, 2006

(30) Foreign Application Priority Data

Sep. 28, 2004 (JP) ............................. 2004-282338

(51) Int. Cl.
*H04L 12/66* (2006.01)
(52) U.S. Cl. .................................. 370/352; 379/112.01
(58) Field of Classification Search ...................... None
See application file for complete search history.

(56) References Cited

U.S. PATENT DOCUMENTS 6,738,457 B1 * 5/2004 Pickering et al. ......... 379/88.16
6,934,376 B1 * 8/2005 McLaughlin et al. .. 379/212.01
2004/0062380 A1 * 4/2004 Delaney ................. 379/265.02
2005/0141490 A1 * 6/2005 Dolan ......................... 370/352

FOREIGN PATENT DOCUMENTS

| JP | 2003-46646 | 2/2003 |
| JP | 2004-032022 | 1/2004 |
| JP | 2004-32022 | 1/2004 |

* cited by examiner

*Primary Examiner*—Phirin Sam
(74) *Attorney, Agent, or Firm*—Staas & Halsey LLP

(57) ABSTRACT

The present invention provides a system, method and a memory product storing a computer program for recording call details that allows inexpensive recording of voice data of a phone call on the IP phone system, while easily maintaining high sound quality of the call. A CDR system is provided with a transferring means for transferring the voice packet to a receiving side IP phone upon receipt thereof from the calling side IP phone and records the voice packet upon receipt thereof from the calling side phone and the receiving side phone in a recording means, and a call controller acquires a condition for deciding whether or not to record the voice packet representing the call between the phones; and transmits information relating to a destination with which a call with the transferring means is to be established, in case of having decided to record the voice packet representing the call.

12 Claims, 11 Drawing Sheets

FIG. 7

222 CDR CONDITION TABLE

| No. | RECORDING ON/OFF | CALLING PARTY | RECEIVING PARTY | TIME |
|---|---|---|---|---|
| 1 | ON | 0500010041 | 0500010043 | * |
| 2 | ON | 0500010042 | 0500010043 | 0:00~6:00 |
| 3 | OFF | * | 0500010043 | * |
| 4 | ON | * | 0500010044 | * |
| ... | ... | ... | ... | ... |

FIG. 8

| DELETE | RECORDING ON/OFF | COMMUNICA-TION PARTY | TIME DESIGNATION |
|---|---|---|---|
| | ⊙ON ○OFF | 05000010041 | 24 HOURS |
| ☐ | ⊙ON ○OFF | 05000010042 | 00:00~06:00 |
| ☐ | | | |

SETTING CDR CONDITION FOR 05000010043

INPUT NEW DATA BELOW

○ON ○OFF  ○24 HOURS
○TIME DESIGNATION: [    ] ~ [    ]

IF NOT INCLUDED: ○TO RECORD ⊙NOT TO RECORD

[REGISTER]  [CANCEL]

SYSTEM AND METHOD FOR RECORDING CALL DETAILS AND MEMORY PRODUCT

CROSS REFERENCE TO RELATED APPLICATION

This Nonprovisional application claims priority under 35 U.S.C. § 119(a) on Patent Application No. 2004-282338 filed in Japan on Sep. 28, 2004, the entire contents of which are hereby incorporated by reference.

BACKGROUND OF THE INVENTION

1. Field of the Invention

The present invention relates to a system and method for recording call details utilizing an IP (Internet Protocol) phone, and to a computer program associated therewith.

2. Description of the Related Art

Along with the recent development of high-speed internet environment through ADSL or FTTH, and popularization of broadband networks, the IP phone system based on a VoIP technique has been rapidly spreading. An existing IP phone system employs a computer provided with a call controller for controlling outgoing calls and incoming calls through a network such as the Internet, whereby voice data representing the contents of a call between phones does not pass through the call controller, but is exchanged through the network in a form of a voice packet, converted into an IP packet between the phones on the calling party and on the receiving party.

Under such circumstances, it is increasingly becoming necessary to keep record of the contents of phone calls, for example for facilitating investigation of a growing number of high-tech crimes and terrorism and the like, or for preserving evidence to cope with the sharp increase in the number of lawsuits. However, the IP phone system has a drawback that, as already stated, the computer provided with the call controller is unable to record contents of the call, and that hence a provider of the phone service cannot keep record of the contents of the phone call.

It could be an option to provide a phone with a recording system and a recording medium for preserving call details, however this is practically unfeasible from the viewpoint of introductory cost necessary for providing each single phone with a recording system and a recording medium. Besides, when a ubiquitous environment is more widely established under which different phones can be used for an identical number, the content of a call is recorded in those different phones, which makes it difficult to identify the phone in which required voice data is recorded.

In order to solve such problems, for example Japanese Patent Application Laid Open No. 2003-46646 discloses a call detail recording system which requires both of the phones in use for a call to switch the connection to a server having a recording function, so as to ensure that voice data representing the phone call passes through the server, and to thereby enable the server to record the voice data representing the phone call.

BRIEF SUMMARY OF THE INVENTION

The present invention has been conceived in view of the foregoing situation, with an object to provide a system and a method for recording call details that allows inexpensively recording voice data of a phone call on the IP phone system, while easily maintaining high sound quality of the communication being made, and a computer program associated with such system and method.

For achieving such object, a first aspect of the present invention provides a call detail recording system (hereinafter referred to as a "CDR" system) for recording a voice packet representing a call between a plurality of phones in recording medium, which employs IP (Internet Protocol) phones for connecting the plurality of phones via communication means for exchanging therebetween voice data representing the call made between the phones in a form of a voice packet converted into an IP packet format, comprising call controlling means for controlling an outgoing call and an incoming call from/to a phone; characterized by comprising transferring means for transferring the voice packet to a receiving side phone (or a calling side phone) upon receipt thereof from the calling side phone (or the receiving side phone); call detail recording means for recording the voice packet upon receipt thereof from the calling side phone and the receiving side phone; wherein the call controlling means comprises condition acquiring means for acquiring a condition for deciding whether or not to record the voice packet representing the call between the phones, deciding means for deciding whether or not to record the voice packet representing the call between the phones based on the acquired condition, and destination transmitting means for transmitting information relating to a destination with which a call with the transferring means is to be established, to the calling side phone (or the receiving side phone), in case where the deciding means has decided to record the voice packet representing the call between the phones.

A second aspect of the present invention provides the CDR system according to the first aspect, wherein the condition for deciding whether or not to record the voice packet representing the call between the phones is whether or not the call controller has received a signal instructing to start recording the voice packet representing the call between the phones.

A third aspect of the present invention provides the CDR system according to the first aspect, wherein phone identification information is recorded, and the condition for deciding whether or not to record the voice packet representing the call between the phones is whether or not at least one of identification information of a calling side phone and identification information of a receiving side phone matches the recorded phone identification information.

A fourth aspect of the present invention provides a call detail recording method (hereinafter referred to as a "CDR" method) which employs IP phones in which a plurality of phones are connected via communication means for exchanging therebetween voice data representing a call made between the phones in a voice packet with an IP packet format, comprising a first computer which controls an outgoing call and an incoming call from/to a phone; and a second computer which records in recording means the voice packet representing the call between the phones; wherein the first computer transfers the voice packet to a receiving side phone (or a calling side phone) upon receipt thereof from the calling side phone (or the receiving side phone); acquires a condition for deciding whether or not to record the voice packet representing the call between the phones; decides whether or not to record the voice packet representing the call between the phones based on the acquired condition; and transmits information relating to a destination with which a call with the second computer is to be established, to the calling side phone (or the receiving side phone) in case where the first computer has decided to record the voice packet representing the call between the phones; and the second computer records the voice packet in the recording means upon receipt thereof from the calling side phone and the receiving side phone.

A fifth aspect of the present invention provides the CDR method according to the fourth aspect, wherein the condition for deciding whether or not to record the voice packet representing the call between the phones is whether or not the call controller has received a signal instructing to start recording the voice packet representing the call between the phones.

A sixth aspect of the present invention provides the CDR method according to the fourth aspect, wherein phone identification information is recorded, and the condition for deciding whether or not to record the voice packet representing the call between the phones is whether or not at least one of identification information of a calling side phone and identification information of a receiving side phone matches the recorded phone identification information.

A seventh aspect of the present invention provides a computer program for use in communication through an Internet Protocol (IP) phone in which a plurality of phones are connected via communication means for exchanging therebetween voice data representing a call made between the phones in a form of a voice packet converted into an IP packet format, to be executed by an external computer which controls an outgoing call and an incoming call from/to a phone and records in recording means the voice packet representing the call between the phones, wherein the computer is caused to serve as transferring means for transferring the voice packet to a receiving side phone (or a calling side phone) upon receipt thereof from a calling side phone (or a receiving side phone); condition acquiring means for acquiring a condition for deciding whether or not to record the voice packet representing the call between the phones, deciding means for deciding whether or not to record the voice packet representing the call between the phones based on the acquired condition, and destination transmitting means for transmitting information relating to a destination with which a call with the transferring means is to be established, to the calling side phone or the receiving side phone, in case where the deciding means has decided to record the voice packet representing the call between the phones.

An eighth aspect of the present invention provides the computer program according to the seventh aspect, wherein the condition for deciding whether or not to record the voice packet representing the call between the phones is whether or not the call controller has received a signal instructing to start recording the voice packet representing the call between the phones.

A ninth aspect of the present invention provides the computer program according to the seventh aspect, wherein phone identification information is recorded, and the condition by which to decide whether or not to record the voice packet representing the call between the phones is whether or not at least one of identification information of a calling side phone and identification information of a receiving side phone matches the recorded phone identification information.

A tenth aspect of the present invention provides a CDR (call detail recording) system, used in case of communication with IP (Internet Protocol) phones, which connects a plurality of phones via communication means for exchanging therebetween voice data representing a call made between the phones in a voice packet with an IP packet format, comprising a processor capable of performing the operations of controlling an outgoing call and an incoming call from/to a phone; transferring the voice packet to a receiving side phone (or a calling side phone) upon receipt thereof from a calling side phone (or a receiving side phone); and recording in recording means the voice packet upon receipt thereof from a calling side phone and a receiving side phone; wherein a voice packet representing a call between a plurality of phones is recorded in recording means; and the system comprising the processor further capable of performing the operations of acquiring a condition for deciding whether or not to record the voice packet representing the call between the phones; deciding whether or not to record the voice packet representing the call between the phones based on the acquired condition; and transmitting information relating to a destination with which to establish a call with outside is to be established to the calling side phone (or the receiving side phone), in case where the processor has decided to record the voice packet representing the call between the phones.

According to the first, fourth, seventh and tenth aspects of the present invention, in a call through IP phones, when the acquired condition is satisfied, a signal indicating acceptance of a voice packet from a calling side phone is transmitted to the second computer other than that provided with a call controller, so that the voice packet to be exchanged between the phones is transmitted from the calling side phone (or receiving side phone) to the receiving side phone (or calling side phone), via the second computer serving as a relay apparatus. The voice packet representing the call relayed by the second computer is recorded in recording means connected to the relay apparatus. Accordingly, the transmission destination of the voice packet representing the call can be changed to the second computer, which is the relay apparatus, in case where the call controller has decided that the condition for recording the content of the communication is satisfied, even while a call being made between users through ordinary call and receipt via phones.

According to the second, fifth and eighth aspects of the present invention, the voice data representing the communication is recorded when a signal instructing to start recording the voice packet representing the call is received. Such arrangement allows recording of the voice data in case where the instruction to start recording the voice data representing the call is expressly received.

According to the third, sixth and ninth aspects of the present invention, the voice data representing the call is recorded in case where at least one of identification information of a calling side phone and identification information of a receiving side phone matches the recorded phone identification information. Such arrangement allows recording of the voice data representing the call when the call is started from a specific phone, or is made with a specific phone designated as the receiving party, or is made between specific phones.

According to the first, fourth and seventh aspects of the present invention, the transmission destination of the voice packet representing the call can be changed to the second computer, which is the relay apparatus, in case where the call controller has decided that the condition for recording the content of the call is satisfied, even during a call being made between users through ordinary call and receipt via a phones. Therefore, the voice data from the phones alone can be transferred to the destination phone via the second computer serving as the relay apparatus without suspending the call, in other words the voice message being exchanged can be kept from being interrupted even when recording the voice data representing the call, which enables maintenance of a high sound quality of the call.

Also, the only additional function required from the call controller is to transmit the IP address of the second computer serving as the relay apparatus to the phone, and functions of an existing IP phone can be applied as they are to realize the CDR system according to the present invention. Therefore, the CDR system can be inexpensively achieved without newly introducing an additional apparatus.

According to the second, fifth and eighth aspects of the present invention, the voice data can be recorded in case where the instruction to start recording the voice data representing the call is expressly received. Such an arrangement enables starting of the recording at any desired point where the necessity of recording of the voice data representing the call has emerged, and by changing the transmission destination of the voice packet representing the call from the receiving side phone (or calling side phone) to the second computer, which is the relay apparatus, only the voice data from the phones can be transmitted to the destination phone via the second computer serving as the relay apparatus without suspending the call, in other words, the voice message being exchanged can be kept from being interrupted even when recording the voice data representing the call, which enables maintaining a high sound quality of the call.

According to the third, sixth and ninth aspects of the present invention, the voice data representing the call can be recorded when the call is started from a specific phone, or is made with a specific phone designated as the receiving party, or is made between specific phones. Therefore, by specifying in advance the phones a call through which is to be recorded, only the voice data from the phones can be transmitted to the destination phone via the second computer serving as the relay apparatus without suspending the call, by changing the transmission destination of the voice packet representing the call from the receiving side phone (or calling side phone) to the second computer, which is the relay apparatus, only when the call is started from a specific phone, or is made with a specific phone designated as the receiving party, or is made between specific phones. In other words, the voice message being exchanged can be kept from being interrupted even when recording the voice data representing the call, which enables maintenance of a high sound quality of the call.

BRIEF DESCRIPTION OF THE DRAWINGS

FIG. 7 shows an example of data arrangement in a CDR condition table;

FIG. 8 shows an example of a CDR condition setting screen for inputting data to be recorded into the CDR condition table;

DETAILED DESCRIPTION OF THE INVENTION

As already stated, the existing CDR system requires that a request for switching the connection to a server is to be transmitted to the phones of the both parties making a call, because of which the phones to be used for communication have to be provided with at least means for receiving the connection switching request and means for switching the connection to the server. Thus, a conventional IP phone cannot serve for achieving the proposed CDR system, and though the investment in equipment can be suppressed in comparison with the case of providing each single IP phone with a recording system and a recording means, disadvantages in different aspects have been incurred, such as an increase in the installation space of the IP phone and in the installation cost of the same, caused by introducing an additional apparatus.

Besides, switching the connection of the IP phone being used for a call may cause interruption of the voice message, which makes it difficult to maintain the sound quality during the call at a desired level.

The present invention has been conceived in view of the foregoing situation, with an object to provide a system and a method for recording call details and a computer program that allow inexpensively recording voice data of a phone call on the IP phone system, while easily maintaining high sound quality of the call being made, which can be achieved according to the following embodiment.

Figure 1:
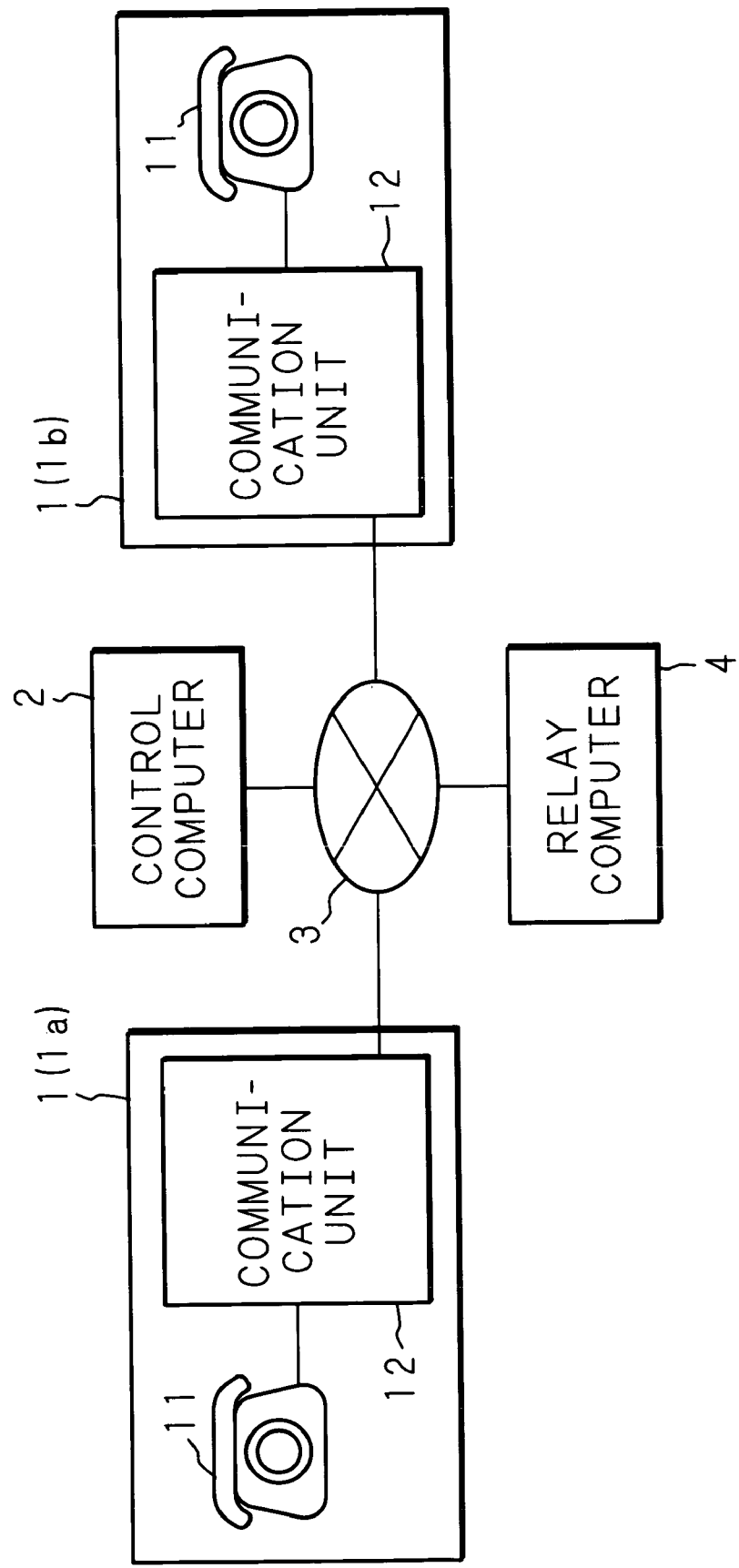
FIG. 1 is a block diagram showing a configuration of a CDR system according to an embodiment of the present invention.

FIG. 1 is a block diagram showing a configuration of a CDR system according to an embodiment of the present invention. As shown therein, a plurality of IP phones 1, 1, . . . for making a call are provided with a calling unit 11 for a voice exchange and a communication unit 12 for executing communication with an external party, and a call is sent and received via a communication network 3. The voice of the communication input at the voice unit 11 is converted into an IP (internet protocol) packet format, to be thereby forwarded to the network 3 as a converted voice packet. Here, the network 3 may be any of an IP network, a public subscriber network and so forth, as long as the IP packet can be transmitted therethrough.

The voice packet sent out to the network 3 is turned back into the voice at the communication unit 12 of the destination IP phone 1, to be output for replay through the voice unit 11. Thus the communication unit 12 is also provided with a function of analog-digital conversion.

Outgoing call data is sent out to the network 3, so that the call is established as in a conventional manner, by a control computer 2 which is a relay apparatus of a telecommunication service provider. The voice packet is sent out to the network 3, so as to be transmitted to the destination IP phone 1.

The IP phone 1 at least includes a calling unit 11 which is an ordinary phone, and a communication unit 12 capable of executing analog-digital conversion of a voice, such as a VoIP adapter. The communication unit 12 may also be equipped with a routing function. Also, the IP phone 1 may be for example a personal computer equipped with an IP phone function, without limitation to a phone exclusively designed for telecommunication.

Figure 2:
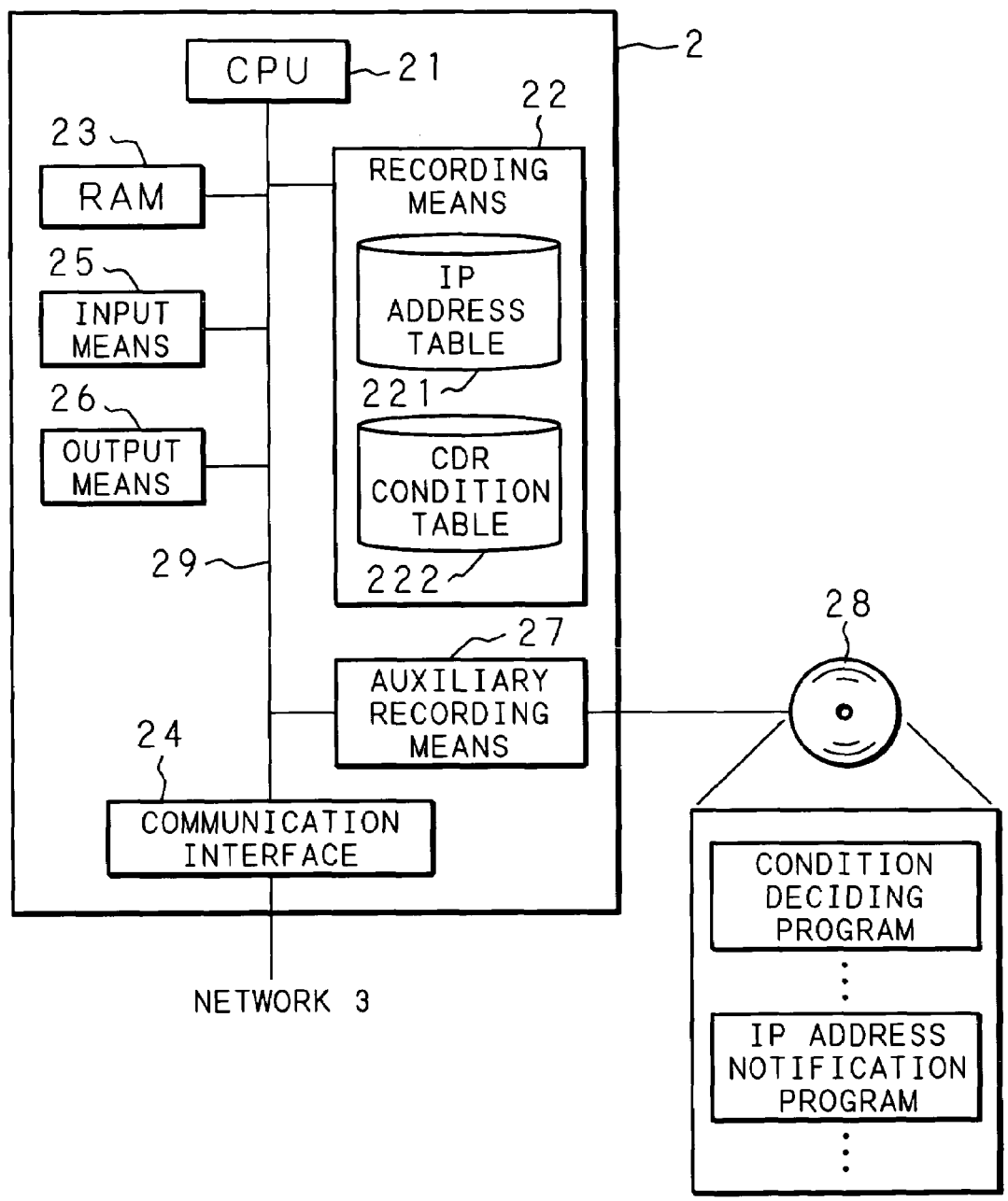
FIG. 2 is a block diagram showing a configuration of a control computer of the CDR system according to the embodiment of the present invention.

FIG. 2 is a block diagram showing a configuration of the control computer 2 of the CDR system according to the embodiment of the present invention. The control computer 2 is constituted of at least a CPU (central processing unit) 21, recording means 22, a RAM 23, a communication interface 24 to be connected to external communication means such as a network 3, input means 25, output means 26, and auxiliary recording means 27 which employs a portable memory product 28 such as a DVD or a CD.

The CPU 21 is connected to each unit of the hardware of the control computer 2 via an internal bus 29, for controlling the respective units of the hardware as well as executing various software functions, according to a processing program contained in the recording means 22, such as a program for deciding for example whether or not a voice recording condition is satisfied, or a program for notifying an IP address of a relay computer 4 to be described later to the IP phones 1, 1, . . . .

The recording means 22 is constituted of a built-in fixed recording device (a hard disk), a ROM and so on, and contains processing programs necessary for the control computer 2 to perform its functions, acquired from an external computer via the communication interface 24 or from the portable memory product 28 for example a DVD or a CD. The recording means 22 not only contains such processing programs, but also an IP address table 221 which stores phone numbers to be used for initiating and receiving calls and corresponding IP addresses, the IP address of the relay computer 4 to be subsequently described, a CDR condition table 222 including conditions for recording details of the calls, and so on.

The RAM 23 is constituted of a DRAM or the like, for recording temporary data generated when executing the software. The communication interface 24 is connected to the internal bus 29, so as to enable transmission/reception of data necessary for the call control and processing, by achieving connection with the network 3 for communication.

The input means 25 includes for example a pointing device for selecting information displayed on a screen such as a mouse, and a keyboard to be manipulated for inputting text data on the screen. The output means 26 is constituted of a display unit which displays an image, such as an LCD or a CRT.

The auxiliary recording means 27 employs the portable memory product 28 such as a DVD or a CD, for downloading a program or data to be processed by the CPU 21 to the recording means 22. It is also possible to write the data processed by the CPU 21 in the auxiliary recording means 27, for backup purpose.

To the network 3, the relay computer 4 is connected for relaying the call content between the plurality of IP phones 1, 1, . . . Meanwhile, this embodiment refers to a case where the control computer 2 and the relay computer 4 are physically separate computers, however these computers may alternatively be integrally constituted in a single computer body.

Figure 3:
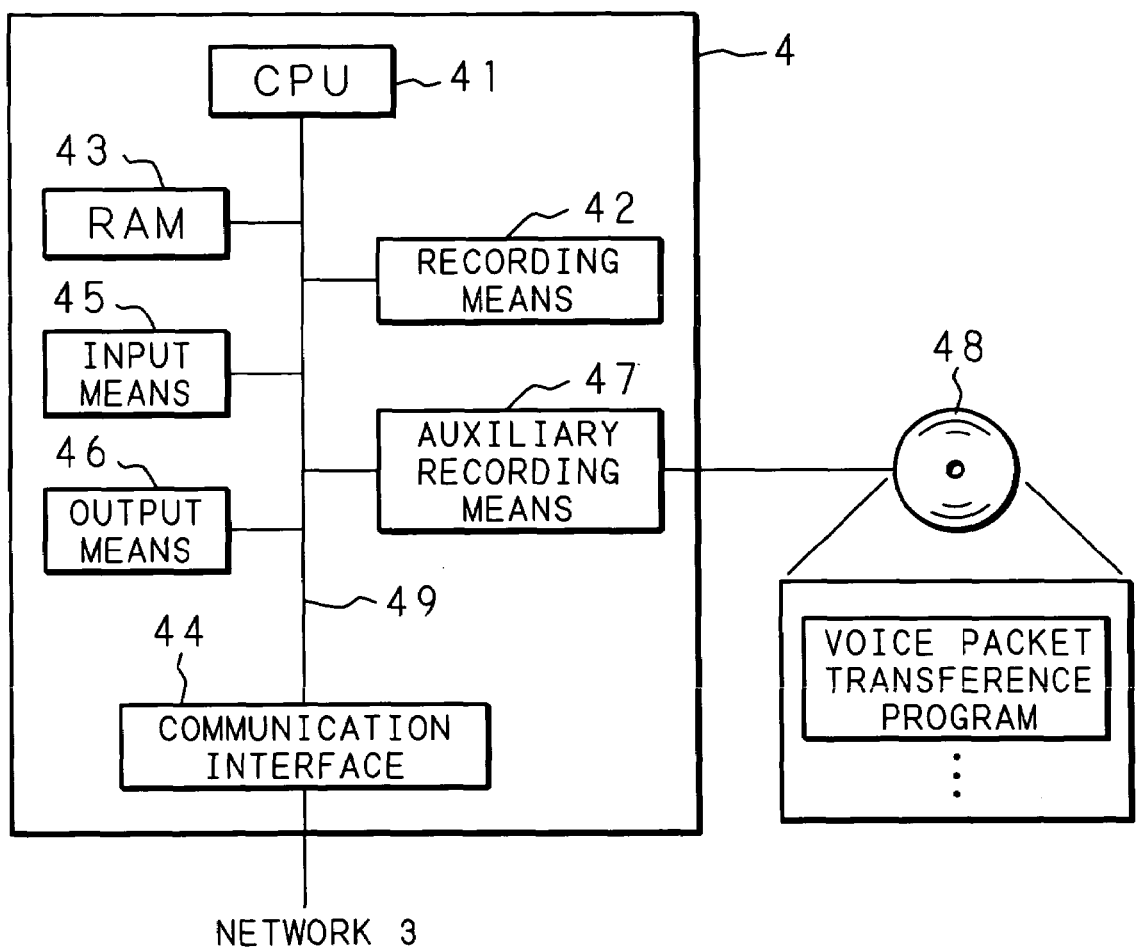
FIG. 3 is a block diagram showing a configuration of a relay computer of the CDR system according to the embodiment of the present invention.

FIG. 3 is a block diagram showing a configuration of the relay computer 4 of the CDR system according to the embodiment of the present invention. The relay computer 4 includes at least a CPU (central processing unit) 41, recording means 42, a RAM 43, a communication interface 44 to be connected to the network 3, input means 45, output means 46, and auxiliary recording means 47 which employs a portable memory product 48 such as a DVD or a CD.

The CPU 41 is connected to each unit of the hardware of the relay computer 4 via an internal bus 49, for controlling the respective units of the hardware as well as executing various software functions, according to a processing program contained in the recording means 42, such as a program for receiving and transferring a voice packet, or a program for recording the received voice packet in the recording means 42.

The recording means 42 is constituted of a built-in fixed recording device (a hard disk), a ROM and so on, and contains processing programs necessary for the relay computer 4 to perform its functions, acquired from an external computer via the communication interface 44 or from the portable memory product 48 such as a DVD or a CD. The recording means 42 also records the received voice packet, in addition to the processing programs.

The RAM 43 is constituted of a DRAM or the like, for recording temporary data generated when executing the software. The communication interface 44 is connected to the internal bus 49, so as to enable transmission/reception of data necessary for execution of the process, by achieving connection with the network 3 for communication.

The input means 45 includes for example a pointing device for selecting information displayed on a screen such as a mouse, and a keyboard to be manipulated for inputting text data on the screen. The output means 46 is constituted of a display unit which displays an image, such as an LCD or a CRT.

The auxiliary recording means 47 employs the portable memory product 48 such as a DVD or a CD, for downloading a program or data to be processed by the CPU 41 to the recording means 42. It is also possible to backup the data processed by the CPU 41, or to write the received voice packet, in the auxiliary recording means 47.

Figure 4:
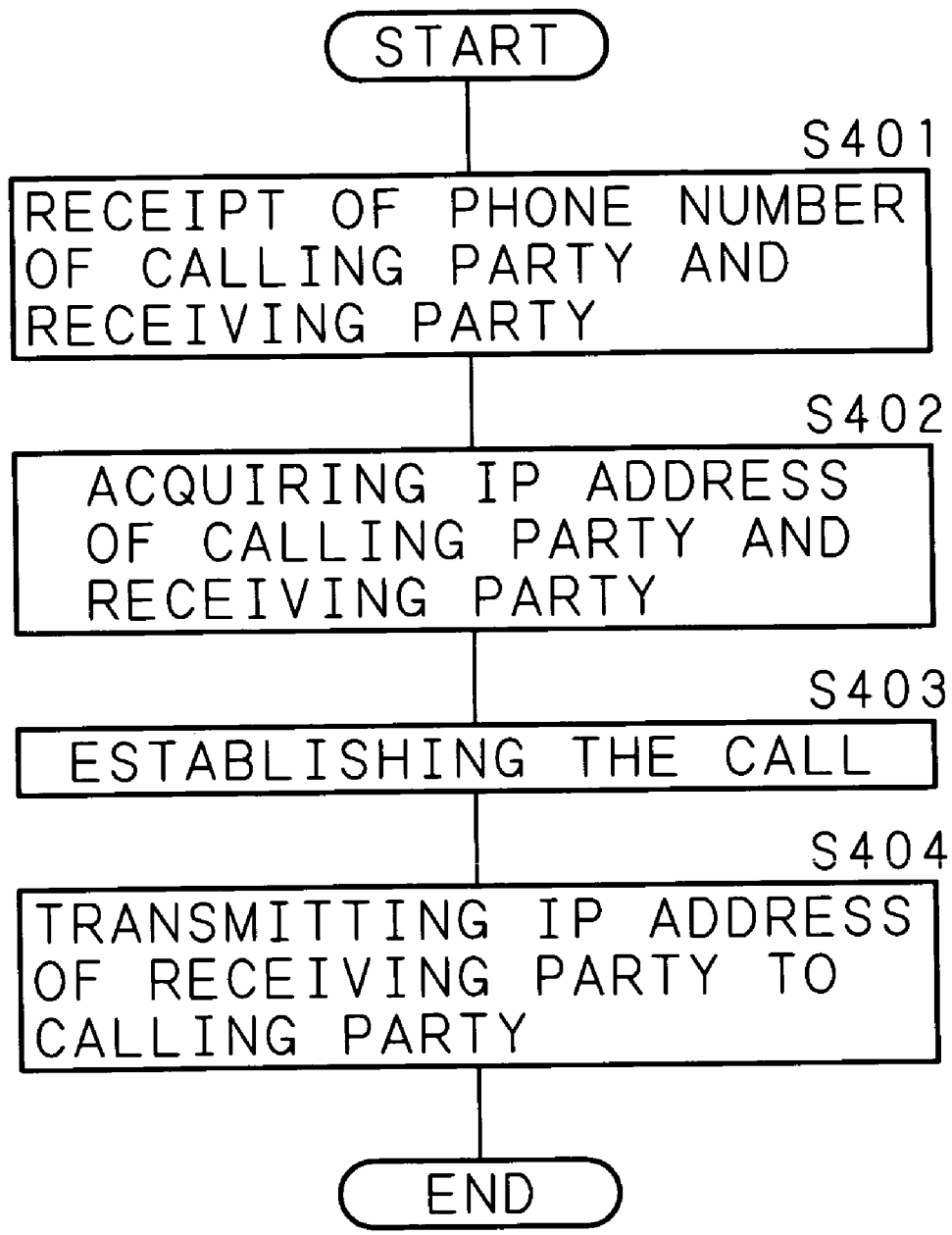
FIG. 4 is a flowchart showing processing steps of the CPU of the control computer in case of making a call under the CDR system according to the embodiment of the present invention.

Now, a CDR process to be executed on the CDR system constituted as above will be described hereunder. FIG. 4 is a flowchart showing processing steps of the CPU 21 of the control computer 2, in case of making a call on the CDR system according to the embodiment of the present invention.

When making a phone call from an IP phone 1a, the user inputs the phone number of the receiving side IP phone 1b through the calling unit 11. The calling unit 11 transmits the input phone number and the phone number of the IP phone 1a which has received the input to the communication unit 12, so that the communication unit 12 makes an outgoing call by transmitting the both phone numbers to the control computer 2 which serves as a relay apparatus (call controller) via the network 3.

The CPU 21 of the control computer 2 receives the transmitted numbers (step S401), and looks up the IP address table 221 stored in the recording means 22, to thereby acquire the IP address of the calling side IP phone 1a and the IP address of the receiving side IP phone 1b (S402).

Figure 5:
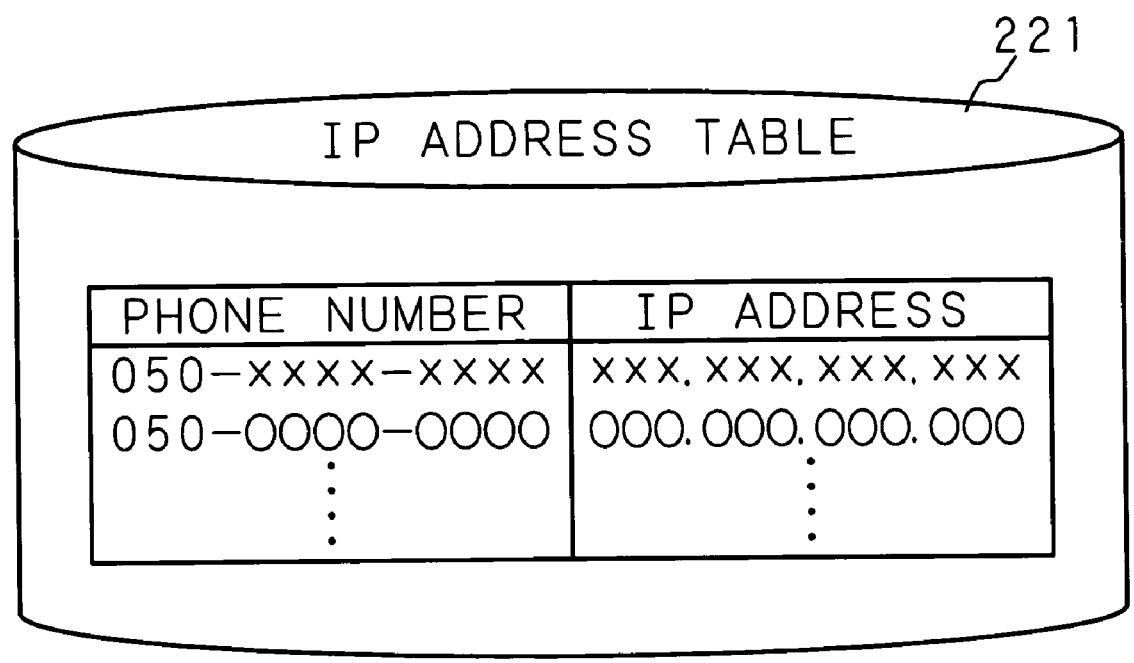
FIG. 5 shows an example of data arrangement in an IP address table.

FIG. 5 shows an example of data arrangement in the IP address table 221. In the example of FIG. 5, the phone number unique to the respective IP phones 1, 1, . . . and the correspondence IP address are stored in one-to-one correspondence. With such arrangement, simply looking up the IP address table 221 enables extracting the IP addresses of the calling side and receiving side IP phones 1a, 1b.

Here, while this embodiment represents a case where the phone numbers of the IP phones 1, 1, . . . are allocated in a similar numbering system to that of the existing subscriber line, a different numbering system may be employed, as long as the system provides information for identifying the calling parties.

For example, a user ID may be adopted as the IP phone number. In this case, the IP address table 221 may store the user ID taken up as the phone number and the IP address in one-to-one correspondence. An outgoing call from the IP phones 1, 1, . . . is also made by designating the user ID, and when the CPU 21 of the control computer 2 has received a call request from the IP phone 1a, the CPU 21 of the control computer 2 acquires the user ID contained in the call request and looks up the IP address table 221 based on the user ID so as to acquire the corresponding IP address.

Further, the IP address table 221 may have a function of updating the IP address and so on to be stored in association with the phone number and user ID according to the way that the user is utilizing the phone, in view of adapting to the upcoming ubiquitous environment.

The CPU 21 establishes a call with the receiving side IP phone 1b through the network 3 (S403), and transmits the acquired IP address to the calling side IP phone 1a through the network 3 (S404).

The IP phone 1a, upon receiving the IP address of the receiving side IP phone 1b, receives an input of voice at the calling unit 11 and converts the voice into a voice packet at the communication unit 12, after which the IP phone 1a transmits the voice packet to the IP address of the receiving side IP phone 1b through the network 3. The receiving side IP phone 1b extracts the IP address of the calling side IP phone 1a out of the voice packet that has been received, and likewise receives the input of the voice at the calling unit 11 and converts the voice into a voice packet at the communication unit 12, after which the IP phone 1b transmits the voice packet to the IP address of the calling side IP phone 1a through the network 3. That is how a call is made between the IP phones 1, 1.

Figure 6:
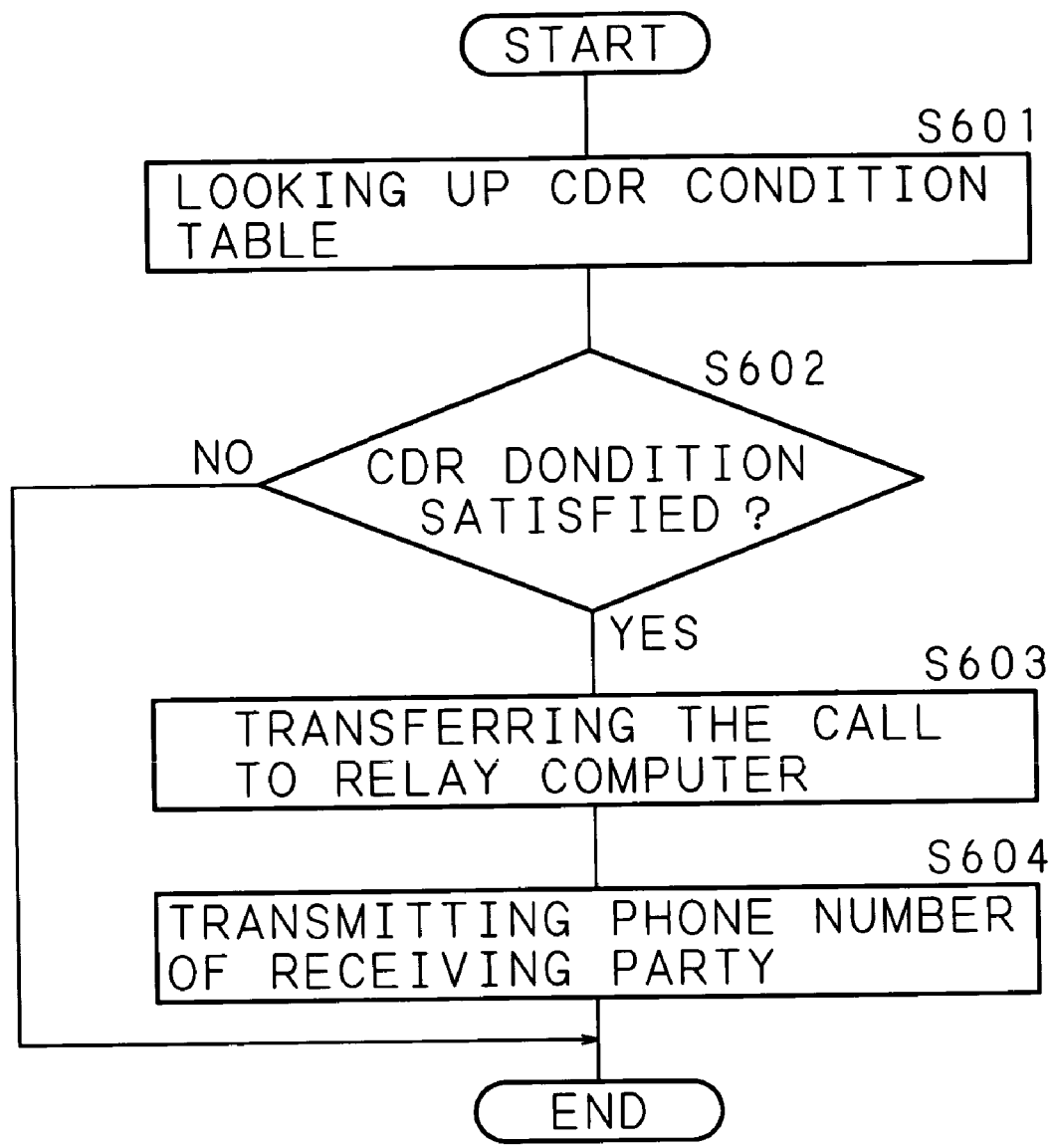
FIG. 6 is a flowchart showing processing steps of the CPU of the control computer in case of recording a content of a call on the CDR system according to the embodiment of the present invention.

FIG. 6 is a flowchart showing processing steps of the CPU 21 of the control computer 2, in case of recording the content of a call on the CDR system according to the embodiment of the present invention. A condition for deciding whether to start recording the content of a call is to be stored in advance, in the CDR condition table 222 of the recording means 22 of the control computer 2. FIG. 7 shows an example of data arrangement in the CDR condition table 222.

Referring to FIG. 7, the column of "recording on/off" indicates whether a condition is for starting to record the call or for stopping recording, for which purpose the phone numbers of the calling side and receiving side phones are respectively stored in the columns of "calling party" and "receiving party". For instance, the condition "1" specifies a condition that out of the incoming calls to "05000010043", all the calls from "05000010041" are to be recorded. Also, the condition "2" specifies a condition that out of the incoming calls to "05000010043", all the calls from "05000010042" received in a time frame of "0:00 to 6:00" are to be recorded.

FIG. 8 shows an example of a CDR condition setting screen, for inputting data to be stored in the CDR condition table 222. As shown therein, the number of a calling side phone, a time frame for recording and so forth are to be specified with respect to each of the receiving side phone numbers. Here, the CDR condition setting screen for inputting data to be stored in the CDR condition table 222 is displayed in the display unit (the output means) 26 of the control computer 2, so that an operator inputs the data through the input means 25 of the control computer 2. It is a matter of course that the inputting method is not limited to such one, and that the CDR condition setting screen may be output for display by a second computer (not shown) connected to the communication unit 12 of the IP phones 1, 1, . . . , so that the data is input through an input device of the second computer, to then be transmitted to the control computer 2 through the communication unit 12.

The CPU 21 of the control computer 2, upon receipt of an outgoing call from an IP phone 1a, looks up the CDR condition table 222 (step S601), to thereby decide whether a CDR condition is satisfied (S602). In case where the CPU 21 decides that the CDR condition is satisfied, the CPU 21 transfers the call to the relay computer 4 stored in the recording means 22 (S603), and transmits the phone number of the receiving side phone to the relay computer 4 (S604). The relay computer 4, to which the call has been transferred, notifies the IP address of the relay computer 4 to the IP phone 1a, and calls the receiving side phone through the control computer 2, thus to establish the call to the receiving side IP phone 1b.

The IP phone 1a which is the calling party, upon receipt of the IP address of the relay computer 4, transmits a voice packet representing the content of the call to the relay computer 4, which acts as transferring means of the voice packet and as CDR means for recording the voice packet representing the content of the call.

Figure 9:
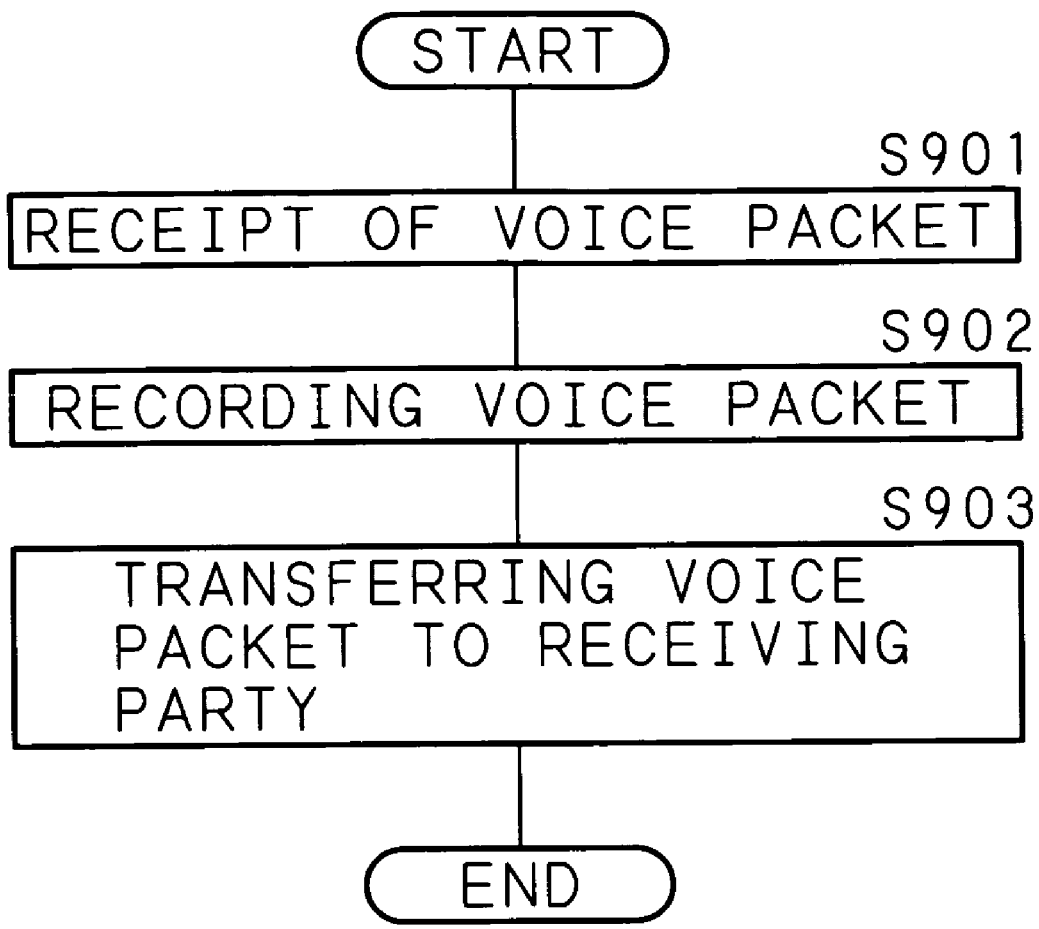
FIG. 9 is a flowchart showing processing steps of the CPU of the relay computer of the CDR system according to the embodiment of the present invention.

FIG. 9 is a flowchart showing processing steps of the CPU 41 of the relay computer 4 of the CDR system according to the embodiment of the present invention. The CPU 41 of the relay computer 4 receives a voice packet representing the content of the call (step S901), and records the voice packet representing the communication in the recording means 42 in association with the IP address of the calling side IP phone 1a (S902). The CPU 41 transfers the voice packet to the receiving side IP phone 1b, which corresponds to the receiving party designated by the control computer 2 (S903).

The IP phone 1b, upon receipt of the voice packet, receives an input of a content of the call through the calling unit 11, and converts the content of the call into a voice packet at the communication unit 12, thus to transmit the voice packet representing the call to the relay computer 4. Thereafter, through repetition of the similar process the content of the call between the IP phones 1a and 1b can be recorded in the recording means 42 of the relay computer 4.

Figure 10:
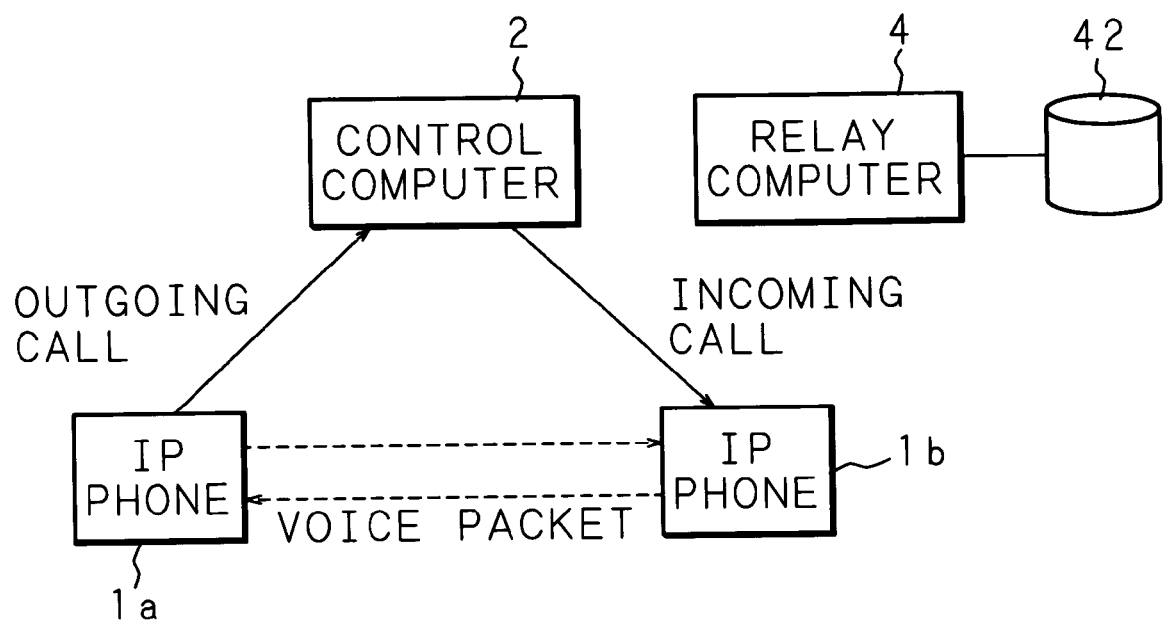
FIG. 10 is a block diagram showing a call controlling route of an IP phone and a transmission/reception route of a voice packet, in case where the content of a call is not to be recorded, on the CDR system according to the embodiment of the present invention.
Figure 11:
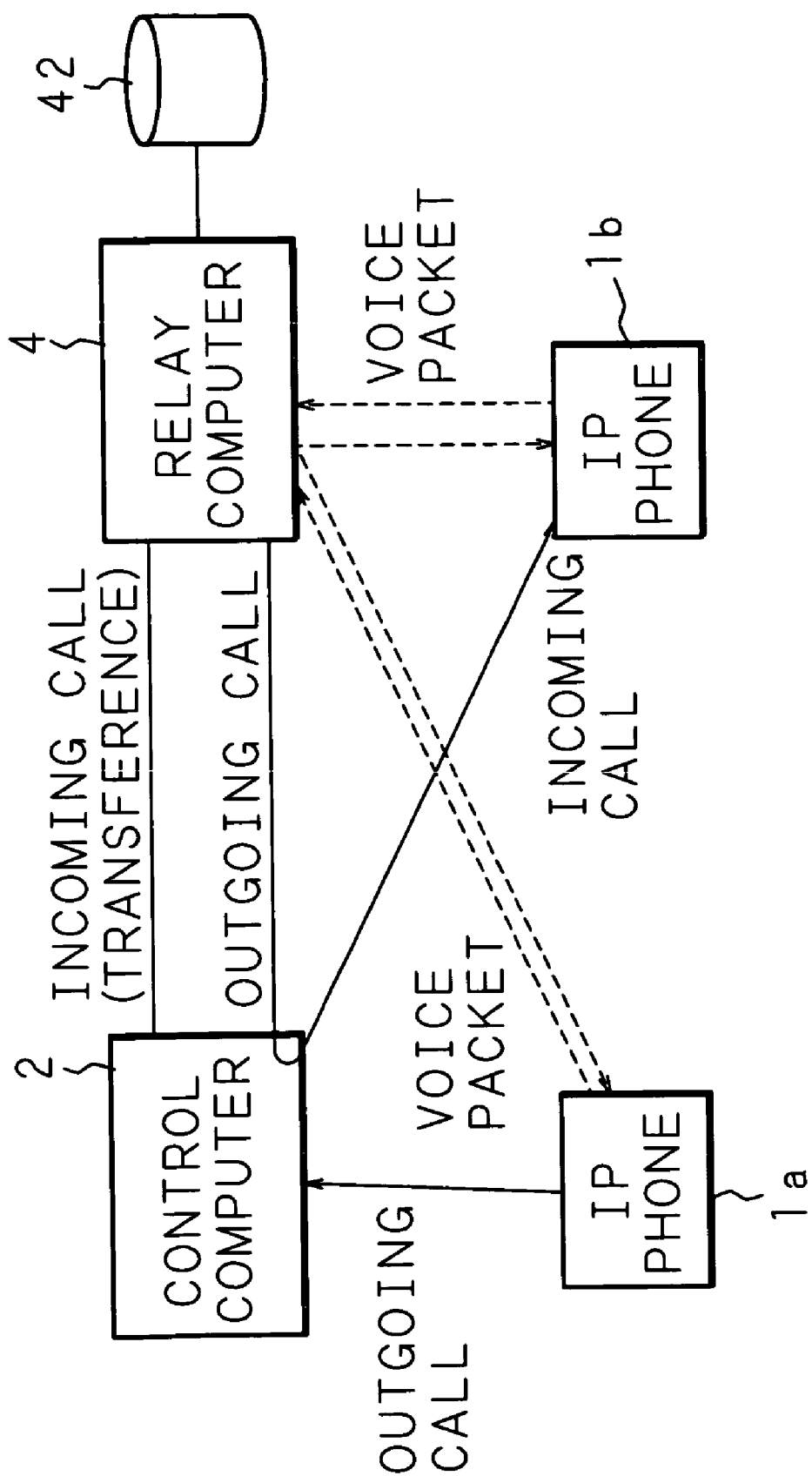
FIG. 11 is a block diagram showing a call controlling route of an IP phone and a transmission route of a voice packet, in case where the content of a call is to be recorded, on the CDR system according to the embodiment of the present invention.

By recording the voice packet representing the call as described above, only the transmission/reception route of the voice packet representing the call is made different from an existing method. FIG. 10 is a block diagram showing a call controlling route of IP phones 1, 1, . . . and a transmission/reception route of a voice packet, in case where the content of a call is not to be recorded, under the CDR system according to the embodiment of the present invention; and FIG. 11 is a block diagram showing a call controlling route of the IP phones 1, 1, . . . and a transmission/reception route of the voice packet, in case where the content of a call is to be recorded, on the CDR system according to the embodiment of the present invention. In FIGS. 10 and 11, the solid lines show the call controlling route and the dotted lines show the transmission/reception route of the voice packet representing the call, respectively.

In case where the call content is not to be recorded, an outgoing call from the IP phone 1a and an incoming call to the IP phone 1b can be established in a similar manner to a conventional method, by utilizing the control computer 2 as the call controller, as shown in FIG. 10. Also, the transmission and reception of the voice packet representing the content of the communication are executed exclusively between the IP phones 1a, 1b, without involving the control computer 2.

By contrast, in case where the content of the call is to be recorded, the outgoing call from the IP phone 1a and the incoming call to the IP phone 1b are achieved by utilizing the control computer 2 as a call controller as shown in FIG. 11, which apparently looks similar to a conventional method. However, the transmission and reception of the voice packet representing the call between the IP phones 1a, 1b are controlled so as to be executed necessarily through the relay computer 4, so that the voice packet representing the call between the IP phones 1a, 1b can easily be recorded in the recording means 42 of the relay computer 4.

Meanwhile, the condition for deciding whether or not to start recording the call may be defined as, for example, whether or not the CPU 21 of the control computer 2 has received a specific signal input by the IP phones 1, 1, ..., instead of storing the condition in the CDR condition table 222 in the recording means 22 of the control computer 2. Here, in case of employing a conventional system of switching the connection to a recording server when the call is established between the IP phones 1a, 1b which are being used, the call which has once been established has to be cut off, to newly establish a call with the recording server. Accordingly, the voice exchange may be interrupted.

On the other hand, the CDR system according to this embodiment eliminates the need to disconnect the established call, and instead simply modifies the transmission/reception route of the voice packet so as to pass through the relay computer 4 without fail, by controlling the mutual transmission destination of the voice packet exchanged between the IP phones 1, 1. Therefore, even when the recording of the voice packet representing the call is started in the process of the call, the call can be kept from being interrupted or from suffering a noise, which enables secure recording of the voice packet representing the communication while maintaining a stable sound quality of the call.

Also, before starting to record the voice packet representing the call, a trigger information for starting the recording may be input by the calling side IP phone 1a and the receiving side IP phone 1b, or either party thereof. For example, in case where the user of the calling side IP phone 1a has decided that the call may be recorded, the user can recognize the input voice and then press a specific button which emits a signal or the like, so that the recording of the call is thereby started. Such an arrangement allows prevention of recording of a voice packet representing a call which the user does not wish to record.

As described above, with the CDR system according to this embodiment, even when recording the voice packet representing a call while the call is being made, the call can be kept from being interrupted or from suffering a noise, which enables secure recording the voice packet representing the call while maintaining a high sound quality of the call.

Further, the content of the call between IP phones can be recorded under the currently existing IP phone environment, without the need to newly introduce an additional device to the IP phone; therefore an environment that enables recording of the call can be built up at a low cost.

Furthermore, the transmission route of a signal for controlling the calls and that of the voice packet data representing the call, which constitutes a large-scaled data, can be distinctly separated, which eliminates the risk of incurring excessive communication traffic or exceeding a specified data transmission limit, and thereby enables secure recording of the voice packet representing the call between IP phones, while maintaining a stable and reliable communication environment.

The invention claimed is:

1. A CDR (call detail recording) system, used in case of communication with IP (Internet Protocol) phones, which connects a plurality of phones via communication means for exchanging therebetween voice data representing a call made between the phones in a voice packet with an IP packet format, comprising:
    call controlling means for controlling an outgoing call and an incoming call from/to a phone;
    transferring means for transferring the voice packet to a receiving side phone (or a calling side phone) upon receipt thereof from the calling side phone (or the receiving side phone); and
    call detail recording means for recording the voice packet upon receipt thereof from the calling side phone and the receiving side phone;
    wherein a voice packet representing a call between a plurality of phones is recorded in recording means; and
    the call controlling means comprises:
    condition acquiring means for acquiring a condition for deciding whether or not to record the voice packet representing the call between the phones;
    deciding means for deciding whether or not to record the voice packet representing the call between the phones based on the acquired condition; and
    destination transmitting means for transmitting information relating to a destination with which a call with the transferring means is to be established, to the calling side phone (or the receiving side phone), in case where the deciding means has decided to record the voice packet representing the call between the phones.

2. The CDR system according to claim 1, wherein the condition is whether or not the call controller has received a signal instructing to start recording the voice packet representing the call between the phones.

3. The CDR system according to claim 1, wherein phone identification information is recorded, and the condition is whether or not at least one of identification information of a calling side phone and identification information of a receiving side phone matches the recorded phone identification information.

4. A CDR (call detail recording) system, used in case of communication with IP (Internet Protocol) phones, which connects a plurality of phones via communication means for exchanging therebetween voice data representing a call made between the phones in a voice packet with an IP packet format, comprising a processor capable of performing the operations of:
    controlling an outgoing call and an incoming call from/to a phone;
    transferring the voice packet to a receiving side phone (or a calling side phone) upon receipt thereof from a calling side phone (or a receiving side phone); and
    recording in recording means the voice packet upon receipt thereof from a calling side phone and a receiving side phone;
    wherein a voice packet representing a call between a plurality of phones is recorded in recording means; and
    the system comprising the processor further capable of performing the operations of:

acquiring a condition for deciding whether or not to record the voice packet representing the call between the phones;

deciding whether or not to record the voice packet representing the call between the phones based on the acquired condition; and transmitting information relating to a destination with which to establish a call with outside is to be established to the calling side phone (or the receiving side phone), in case where the processor has decided to record the voice packet representing the call between the phones.

5. The CDR system according to claim 4, wherein the condition is whether or not the call controller has received a signal instructing to start recording the voice packet representing the call between the phones.

6. The CDR system according to claim 4, wherein phone identification information is recorded, and the condition is whether or not at least one of identification information of a calling side phone and identification information of a receiving side phone matches the recorded phone identification information.

7. A CDR (call detail recording) method, used in case of communication with IP (Internet Protocol) phones, which connects a plurality of phones via communication means for exchanging therebetween voice data representing a call made between the phones in a voice packet with an IP packet format, the method being provided by a first computer, comprising the steps of:

transferring the voice packet to a receiving side phone (or a calling side phone) upon receipt thereof from the calling side phone (or the receiving side phone);

acquiring a condition for deciding whether or not to record the voice packet representing the call between the phones, deciding whether or not to record the voice packet representing the call between the phones based on the acquired condition, and transmitting information relating to a destination with which a call with a second computer is to be established, to the calling side phone (or the receiving side phone), in case where the deciding means has decided to record the voice packet representing the call between the phones;

the method being provided by a second computer, comprising the step of:

recording in recording means the voice packet upon receipt thereof from a calling side phone and a receiving side phone.

8. The CDR method according to claim 7, wherein the condition is whether or not the call controller has received a signal instructing to start recording the voice packet representing the communication between the phones.

9. The CDR method according to claim 7, wherein phone identification information is recorded, and the condition is whether or not at least one of identification information of a calling side phone and identification information of a receiving side phone matches the recorded phone identification information.

10. A memory product, storing a computer program capable of causing a computer to control an outgoing call and an incoming call from/to a phone and to record a voice packet representing a call between a plurality of phones in recording means of an external device, and used in case of a call with IP (Internet Protocol) phones, which connects the plurality of phones via communication means for exchanging therebetween voice data representing the call made between the phones in a voice packet with an IP packet format, wherein the memory product stores a computer program comprising the steps of:

transferring the voice packet to a receiving side phone (or a calling side phone) upon receipt thereof from the calling side phone (or the receiving side phone);

acquiring a condition for deciding whether or not to record the voice packet representing the call between the phones, deciding whether or not to record the voice packet representing the call between the phones based on the acquired condition, and transmitting information relating to a destination with which a call with a second computer is to be established, to the calling side phone (or the receiving side phone), in case where the deciding means has decided to record the voice packet representing the call between the phones.

11. The memory product according to claim 10 storing the computer program, wherein the condition for deciding whether or not to record the voice packet representing a call between the phones is whether or not the call controller has received a signal instructing to start recording the voice packet representing the call between the phones.

12. The memory product according to claim 10 storing the computer program, wherein phone identification information is recorded, and the condition is whether or not at least one of identification information of a calling side phone and identification information of a receiving side phone matches the recorded phone identification information.

* * * * *